US012702997B2

(12) United States Patent
Faers et al.

(10) Patent No.: US 12,702,997 B2
(45) Date of Patent: Aug. 11, 2026

(54) SPRAY UNIT WITH VARIABLE DISC DIAMETER

(71) Applicant: BAYER AKTIENGESELLSCHAFT, Leverkusen (DE)

(72) Inventors: Malcolm Faers, Düsseldorf (DE); Yoshitaka Sato, Tokyo (JP); Andrew Charles Chapple, Langenfeld (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 791 days.

(21) Appl. No.: 17/797,409

(22) PCT Filed: Jan. 28, 2021

(86) PCT No.: PCT/EP2021/051916
§ 371 (c)(1),
(2) Date: Aug. 3, 2022

(87) PCT Pub. No.: WO2021/156126
PCT Pub. Date: Aug. 12, 2021

(65) Prior Publication Data

US 2023/0084991 A1 Mar. 16, 2023

(30) Foreign Application Priority Data

Feb. 5, 2020 (EP) .................................... 20155553
Sep. 23, 2020 (EP) .................................... 20197809

(51) Int. Cl.
*A01M 7/00* (2006.01)
*B05B 3/10* (2006.01)
(Continued)

(52) U.S. Cl.
CPC ......... *B05B 13/005* (2013.01); *A01M 7/0028* (2013.01); *A01M 7/005* (2013.01);
(Continued)

(58) Field of Classification Search
None
See application file for complete search history.

(56) References Cited

U.S. PATENT DOCUMENTS 2,939,636 A 6/1960 Mullin
3,994,438 A 11/1976 Farmery
(Continued)

FOREIGN PATENT DOCUMENTS

AU 640546 B2 8/1993
BE 367163 A 11/1930
(Continued)

OTHER PUBLICATIONS

PCT/EP2021/051916: PCT International Search Report and Written Opinion, dated Apr. 19, 2021. The instant application claims priority (as a national stage filing) to PCT Patent Application No. PCT/EP2021/051916.

(Continued)

*Primary Examiner* — Binu Thomas
(74) *Attorney, Agent, or Firm* — Harness, Dickey & Pierce, P.L.C.

(57) ABSTRACT

The invention relates to a spray unit comprising an axle (20), a disc (30), a disc shape modifying assembly (40) and a liquid applicator (50). The disc is configured to spin about the axle centred on the centre of the disc. The liquid applicator is configured to apply liquid to a surface of the disc. The disc shape modifying assembly is configured to modify the trajectory of the liquid droplets that leave the spray unit by way of varying the diameter of the disc.

16 Claims, 14 Drawing Sheets

(51) Int. Cl.

| | |
|---|---|
| ***B05B 12/08*** | (2006.01) |
| ***B05B 12/12*** | (2006.01) |
| ***B05B 13/00*** | (2006.01) |
| *B64U 101/00* | (2023.01) |

(52) U.S. Cl.

CPC ........ *A01M 7/0082* (2013.01); *A01M 7/0089* (2013.01); *B05B 3/1007* (2013.01); *B05B 12/085* (2013.01); *B05B 12/126* (2013.01); *B64U 2101/00* (2023.01)

(56) References Cited

U.S. PATENT DOCUMENTS

| | | | | |
|---|---|---|---|---|
| 4,541,566 | A * | 9/1985 | Kijima .................. | B05B 3/1007 239/224 |
| 4,609,148 | A * | 9/1986 | Gill ..................... | A01M 7/0028 239/224 |
| 5,020,725 | A | 6/1991 | Waldrum | |
| 5,237,803 | A | 8/1993 | Domingue, Jr. | |
| 2012/0055129 | A1 | 3/2012 | Summach | |
| 2015/0273518 | A1 | 10/2015 | Varanasi et al. | |
| 2019/0039796 | A1 | 2/2019 | Farnham et al. | |
| 2019/0077968 | A1 | 3/2019 | Renner et al. | |

FOREIGN PATENT DOCUMENTS

| | | | |
|---|---|---|---|
| CN | 109077046 | A | 12/2018 |
| CN | 109466772 | A | 3/2019 |
| EP | 0094796 | A1 | 11/1983 |
| EP | 3028567 | A1 | 6/2016 |
| FR | 2836010 | A3 | 8/2003 |
| KR | 20180133819 | A | 12/2018 |
| KR | 20190006646 | A | 1/2019 |

OTHER PUBLICATIONS

EP20155553.9: Extended European Search Report dated Aug. 13, 2020. The instant application has a priority claim related to EP 20155553.9.

* cited by examiner a)

b)

SPRAY UNIT WITH VARIABLE DISC DIAMETER

CROSS-REFERENCE TO RELATED APPLICATIONS

This application is a U.S. national stage filing under 35 U.S.C. § 371 of International Application No. PCT/EP2021/051916, filed on Jan. 28, 2021, which claims the benefit of and priority to European Application No. 20155553.9, filed on Feb. 5, 2020, and European Application No. 20197809.5, filed on Sep. 23, 2020. The entire disclosure of each of the above applications is incorporated herein by reference.

FIELD OF THE INVENTION

The present invention relates to spray unit and to a vehicle having such a spray unit.

BACKGROUND OF THE INVENTION

The application of crop protection products to crops is typically achieved by spray application where the atomisation device is commonly a hydraulic spray nozzle, rotating disc or cage, or an air-shear device. The properties of the atomisation device are very important for the effective application of the crop protection product to crop foliage, especially regarding the droplet sizes produced. The range of drop sizes is known as the drop spectra. Finer atomisation results in a greater number of small droplets that give greater coverage in terms of number of deposits per unit area as well as an increased area under the deposit, both of which are preferred for biological efficacy, whereas coarser atomisation results in a relatively lower number of larger droplets with fewer deposits per unit area. However, smaller droplets are more prone to drift resulting in unwanted off-target losses and generally poorer penetration into canopies, both effects of which can be reduced by using larger, higher momentum droplets but at the cost of reducing the number of opportunities for creating deposits in the canopy being treated. During spray application of a product, however, different parts of the crop field have different requirements for drift mitigation: for example, the edges of the crop field on the downwind side have a greater risk of off-target drift outside the application area than the centre of the field or edges of the field on the upwind side. Another use case is that different weeds, either in type or in size, require different droplet sizes or different agricultural active ingredients have their efficacy expressed differently depending on droplet size. A consequence of this is that it is advantageous to be able to adjust the droplet size continuously during application according to the optimum balance between the number of droplets per unit area required for biological performance and the off-target drift risk. Furthermore, the effects of wind on drift is also important, especially as wind is not constant but varies in all three dimensions, both in time and space, with the consequence that the optimum balance between the number of droplets per unit area and the off-target drift is continuously changing. Therefore, there is a need for a spray device that can continuously adjust its droplet size according to the location of the spray device in the target field and the current wind speed and direction, bearing in mind the biological consequences of such a change in droplet spectra. For example, in gusty conditions, quite large droplets might be needed at the edge of the field in order to control drift, but this reduces the efficacy of the active ingredient, so a greater application rate is required at that point. Balancing these conflicting requirements is difficult to achieve with hydraulic spray nozzles since the nozzle must be either operated at a different pressure or changed to a different orifice size in order to achieve a different spray droplet spectra, both of which take time to enable. However, with a rotating disc, the droplet spectra can be almost instantaneously adjusted by changing the speed of rotation and flow rate to the disc independently from each other. However, reducing the rotational speed of spinning discs e.g., in a unmanned aerial vehicle (UAV), has two consequences: first it increases the droplet size after atomisation, as required; and second, it reduces the velocity of the droplets leaving the disc with the consequence that in particular when included with downwash from a rotor in the UAV or on an air-assisted boom sprayer, the width of the spray cone is reduced with the consequence that the width of the spray swath is reduced and any overlap created by multiple spray swaths is more variable. This is unwanted since it results in an increase in the work rate to treat the same area and a risk of untreated areas between adjacent swaths, as well as the risk of over- and underdosing. Secondly, the rotational speed of the rotors e.g., in an UAV, for example during acceleration/deceleration of the UAV while spraying and also during the reduction of mass of the UAV as the spray liquid is applied affects the amount and velocity of the downwash and subsequent width of the spray swath. Consequently, there is a need for a spray device that can continuously adjust its droplet spectra according to the location of the spray device in the target field, the current wind speed and direction and, the downwash from an UAV rotor and/or the flight height of the UAV without affecting the width of the spray cone and the width of the applied spray swath.

SUMMARY OF THE INVENTION

It would be advantageous to have improved means for the spraying of liquids such as those containing chemical and/or biological agricultural active ingredients.

The object of the present invention is solved with the subject matter of the independent claims, wherein further embodiments are incorporated in the dependent claims. It should be noted that the following described aspects and examples of the invention apply also for the spray unit, the vehicle having one or more spray units.

In a first aspect, there is provided a spray unit. The spray unit comprises an an axle, a disc, a disc shape modifying assembly, and a liquid applicator. The disc is configured to spin about the axle centred on the centre of the disc. The liquid applicator is configured to apply liquid to a surface of the disc. The disc shape modifying assembly is configured to modify the trajectory of the liquid droplets that leave the spray unit by way of varying the diameter of the disc.

In other words, the disc shape modifying assembly can vary the diameter of the spinning disc, thus the geographical position where the droplets leave the spray unit towards the ground and consequently the trajectory of the liquid droplets, and therefore influence the spray swath width. As a consequence thereof, the spray swath width and the liquid droplet size can be varied independently in a way that allows a constant and uniform swath width to be achieved over a wide range of spray droplet sizes.

In this manner, the correct application of active ingredient per plant per unit area of land can be provided.

In an example, the disc shape modifying assembly comprises at least one movable geometry defining component configured to vary the diameter of the disc or a second disc by way of change of at least a part of the geometry defining component's position and wherein the disc shape modifying assembly comprises at least one actuator configured to move the at least one geometry defining component.

In other words, a controllable actuator changes the geometry of the disc diameter and therefore the spray swath width e.g. depending on weather conditions. Alternatively, the diameter geometry of a second disc in proximity of the spinning disc is changed. The liquid droplets leaving the edge of the spinning disc impinge on the second disc. By changing the diameter geometry of the second disc a similar result can be achieved as when the diameter geometry of the spinning disc is changed.

In an example, the disc shape modifying assembly comprises at least one geometry defining component selected from the group of blade, elastic film, slotted circular disc.

In an example, the disc shape modifying assembly comprises at least two blades, each connected to the disc or a second disc by way of at least one blade pivot point wherein the at least one actuator is configured to be connected to at least one of the two blades by way of a blade actuator linkage and wherein the at least two blades are configured to be connected by at least one inter-blade linkage.

In other words, with all blades connected via an inter-blade linkage all blades can be moved simultaneously with the at least one actuator and therefore change the diameter of the spinning disc or a second disc in a consistent and uniform manner. As a consequence, also the spray swath width can be precisely controlled.

In an example, the disc shape modifying assembly comprises a concentric elastic film attached to the edge of the disc or a second disc wherein the disc shape modifying assembly further comprises at least two extendable rods each connected to the disc or a second disc by way of at least one rod pivot point and to the elastic film wherein the rods are configured to stretch or relax the elastic film equally in all radial directions wherein the at least one actuator is configured to be connected to at least one of the two extendable rods by way of a rod actuator linkage and wherein the at least two rods are configured to be connected by at least one inter-rod linkage.

In other words, alternatively to the moving blades discussed before the spinning disc can comprise and elastic film at the edge of the disc (or a second disc) which is uniformly stretchable to different disc diameter sizes. The control of the stretching of the elastic film is achieved via extendable rods connected to the disc (or the second disc) and the elastic film. The extension of the rods is again controlled by the at least one actuator.

In an example, the disc shape modifying assembly comprises at least four rods each connected to the disc or a second disc by way of at least one rod pivot point and to the elastic film, wherein the rods are configured to stretch or relax the elastic film equally in all radial directions wherein the at least one actuator is configured to be connected to at least one of the four extendable rods by way of a rod actuator linkage and wherein the at least four rods are configured to be connected by at least one inter-rod linkage.

In an example, the rods are arranged in a substantially radial symmetrical disposition underneath the disc or underneath a second disc.

In this way, it's possible to easily stretch the elastic film equally in all radial directions.

In an example, the second disc is located axially spaced underneath the disc.

In this manner, it is ensured that there is minimal time and distance between the liquid droplets leaving the edge of the spinning disc and their impingement on the second disc.

In an example, the disc shape modifying assembly comprises at least one slotted circular disc configured to laterally surround the disc and thereby extending the diameter of the disc, wherein the at least one actuator is configured to control the position of the at least one slotted circular disc relative to the disc.

Another alternative to the moving blades respectively the stretchable elastic film is the variation of the diameter of the spinning disc with at least one slotted circular disc that can be moved relatively to the spinning disc and that is able to laterally surround the disc in order to extend the diameter of the disc. Again, the at least one actuator controls the movement of the at least one slotted disc relatively to the spinning disc.

In an example, the disc shape modifying assembly comprises at least two slotted circular discs, wherein the second slotted circular disc is configured to laterally surround the first slotted circular disc and wherein the at least one actuator is configured to control the position of the second slotted circular disc relative to the first slotted circular disc and/or the disc.

In other words, there can be more than one slotted circular disc in order to have more flexibility for varying the diameter of the spinning disc.

In an example, the disc shape modifying assembly is configured to spin about the axle or a second axle.

In this way, not only the spray swath width can be influenced with the disc shape modifying assembly. By changing the rotation speed of the disc shape modifying assembly also the liquid droplet atomisation process of the liquid to be sprayed can be further manipulated if desired. If there is a second disc spinning around a second axle the rotation speed of the second disc can also be different to the rotation speed of the spinning disc providing even more control of the liquid droplet atomisation process.

In an example, the disc shape modifying assembly is non-rotating.

In an example, at least the part of the surface of the disc shape modifying assembly on which the liquid droplets impinge when leaving the outer edge of the disc has a low friction surface.

In other words, in particular when the disc shape modifying assembly is non-rotating and therefore in a fixed position at least the part of the surface of the disc shape modifying assembly on which the liquid droplets of the spinning disc impinge can be composed of a material with very low friction and adhesion such that the individual droplets formed from the spinning disc roll across its surface and do not adhere significantly.

In a second aspect, there is provided a spray vehicle, comprising at least one spray unit according to the first aspect.

In an example, the spray vehicle comprises a liquid tank, at least one spray unit according to the first aspect discussed before, a plurality of sensors and a processing unit. The liquid tank is configured to hold a liquid. The at least one spray unit is configured to spray a liquid. At least one sensor of the plurality of sensors is configured to measure the rotational speed of the disc about the axle centred on the centre of the disc. At least one sensor of the plurality of sensors is configured to measure the liquid flow rate of the liquid applicator to the surface of the disc. The processing unit is configured to determine the liquid droplet size of the liquid droplets that leave the spray unit comprising utilisation of the measured rotational speed of the disc, the measured liquid flow rate of the liquid from the liquid applicator to the surface of the disc, and the physico-chemical properties of the liquid. The processing unit is configured to control the at least one actuator of the spray unit, wherein determination of at least one instruction for the control of the at least one actuator comprises utilisation of the determined liquid droplet size.

In other words, the width of the spray cone and the width of the applied spray swath can be kept constant even though the droplet size is continuously adapted e.g. due to the location of the spray device in the target field, the current wind speed and direction and/or e.g. the downwash from an UAV rotor and/or the flight height of an UAV.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
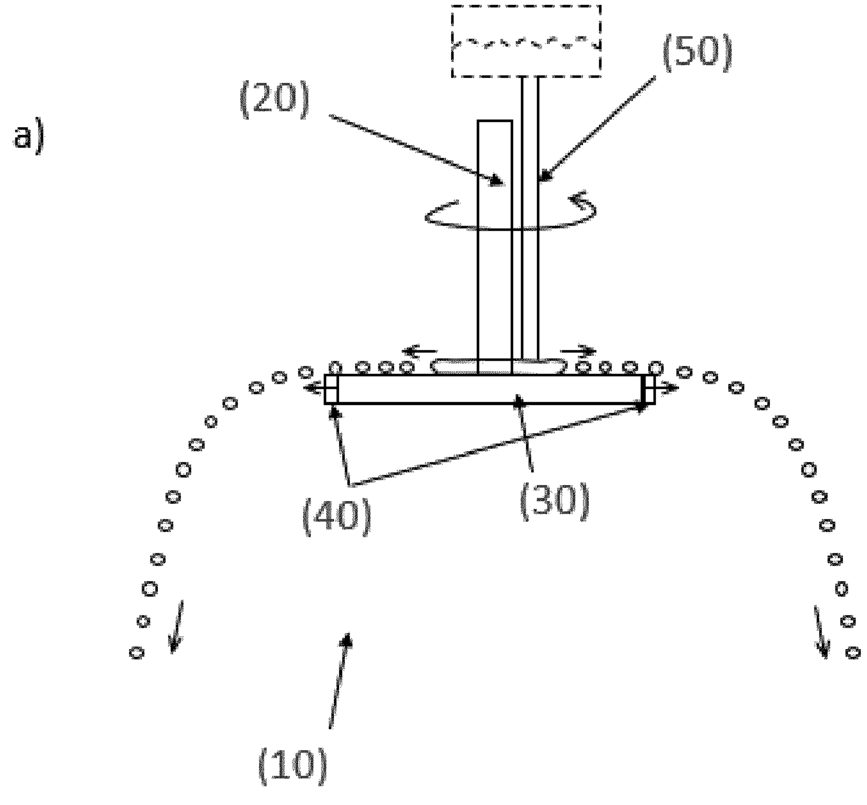
FIG. 1 shows a schematic setup of an example of a newly developed spray unit from side view perspective.
Figure 1:
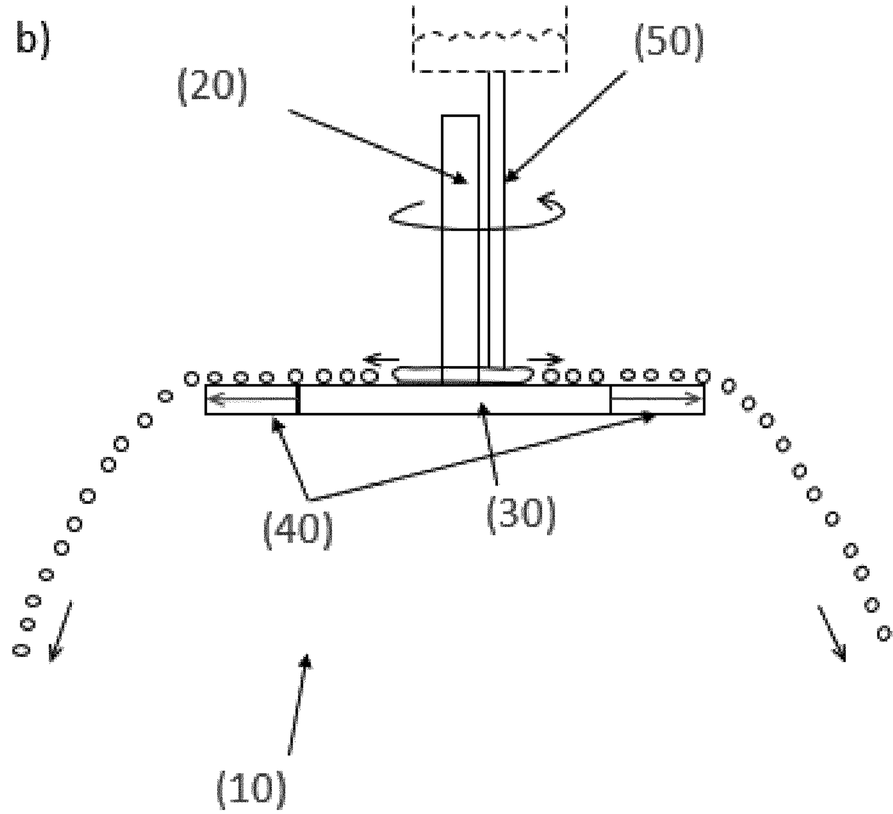

FIG. 1 shows an example of a spray unit 10 from a side view perspective. The spray unit comprises an axle 20, a disc 30, a disc shape modifying assembly 40, a liquid applicator 50. The disc is configured to spin about the axle centred on the centre of the disc. The liquid applicator is configured to apply liquid to a surface of the disc. The disc shape modifying assembly is configured to modify the trajectory of the liquid droplets that leave the spray unit by way of varying the diameter of the disc.

The disc shape modifying assembly can vary the diameter of the disc 30 and therefore influence the spraying swath width. As a result, the correct application of active ingredient per plat per unit area of land can be more easily provided. In example a) of FIG. 1 the spray unit is shown with a narrow spray swath due to a narrower diameter of the disc with the disc shape modifying assembly. In example b) of FIG. 1 the spray unit is shown with a wider diameter of the disc with the disc shape modifying assembly resulting in a wider spray swath (under the assumption that all other parameters such as e.g., rotational speed of the disc, the liquid flow and the liquid itself etc. is the same in example a) and b)).

In an example, the term "disc" refers to a flat disc but also includes cone shaped discs.

In an example, the liquid applicator comprises at least one feed pipe. The feed pipe is configured to transfer liquid from a liquid tank to the disc and to apply the liquid on the disc.

In an example, the liquid applicator comprises at least one liquid tank and at least one feed pipe.

In an example, the term "liquid(s)" refer(s) to liquid(s) comprising chemical and/or biological based agricultural active ingredients such as e.g. herbicides, insecticides, fungicides, crop nutritional agents, biostimulants, plant growth regulators etc.

In an example, the terms "the disc shape modifying assembly is configured to modify the trajectory of the liquid droplets" describe the modification of the geographical position where the liquid droplets leave the spray unit towards the ground. Depending on the rotational speed of the disc, the liquid flow rate, and the liquid, a variation in the diameter of the disc with the disc shape modifying assembly can also lead to a change of the size and/or velocity of liquid droplets that leave the spray unit towards the ground.

In an example, the disc shape modifying assembly is configured to modify the trajectory of the liquid droplets that leave the spray unit by way of varying the diameter of the disc during use of the spray unit. The use of the spray unit refers to the spraying of a target area with the liquid.

In an example, the disc shape modifying assembly is configured to modify the trajectory of the liquid droplets that leave the spray unit by way of varying the diameter of the disc at the same time when the disc spins about the axle centred on the centre of the disc.

In an example, the disc shape modifying assembly is configured to modify the trajectory of the liquid droplets that leave the spray unit by way of varying the diameter of the disc at the same time when the liquid applicator applies liquid to a surface of the disc.

In an example, the arrow close to the axle indicates a potential rotation direction of the axle and the disc. The rotation can also be clockwise.

In an example, the arrows above the plane surface of the disc indicate the direction of the centrifugal force and the atomisation of the liquid.

In an example, the arrows next to the liquid droplets that have left the disc indicate the spraying direction.

In an example, the arrows on the lateral side of the disc shape modifying assembly indicate the direction of the variation of the diameter of the disc with the spray direction assembly.

Figure 2:
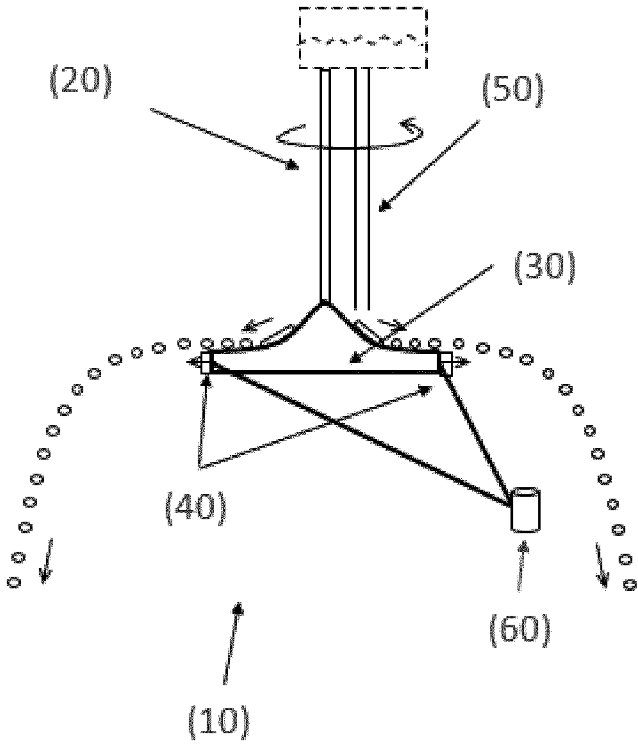
FIG. 2 shows a schematic setup of an example of a spray unit with a cone shaped disc from a side view perspective.

FIG. 2 shows a schematic setup of an example of a spray unit 10 with a cone shaped disc 30 from a side view perspective. Except for the cone shaped disc 30 the spray unit is similar as the one shown in FIG. 1. The spray unit comprises an axle 20, a disc 30, a disc shape modifying assembly 40 and a liquid applicator 50. In this example, also at least one actuator 60 is shown which is configured to vary the diameter of the disc shape modifying assembly. The arrows in FIG. 2 have the same meaning as discussed in the context of FIG. 1.

According to an example, the disc shape modifying assembly 40 comprises at least one movable geometry defining component configured to vary the diameter of the disc 30 or a second disc 31 (in which case the spray unit comprises a second disc 31) by way of change of at least a part of the geometry defining component's position and wherein the disc shape modifying assembly comprises at least one actuator 60 configured to move the at least one geometry defining component.

In an example, at least one actuator refers to at least one mechanical device that converts energy into motion. The source of energy may be, for example, an electric current, hydraulic fluid pressure, pneumatic pressure, mechanical energy, thermal energy, or magnetic energy. For example, an electric motor assembly may be a type of actuator that converts electric current into a rotary motion, and may further convert the rotary motion into a linear motion to execute movement. In this way, an actuator may include a motor, gear, linkage, wheel, screw, pump, piston, switch, servo, or other element for converting one form of energy into motion.

In an example, the location of the at least one actuator 60 is in proximity to the axle 20, the disc 30, and/or the disc shape modifying assembly 40.

According to an example, the disc shape modifying assembly comprises at least one geometry defining component selected from the group of blade 41, elastic film 42, slotted circular disc 43.

In an example, a schematic setup of examples of disc shape modifying assemblies comprising blades is shown in FIGS. 4 to 7.

Figure 8:
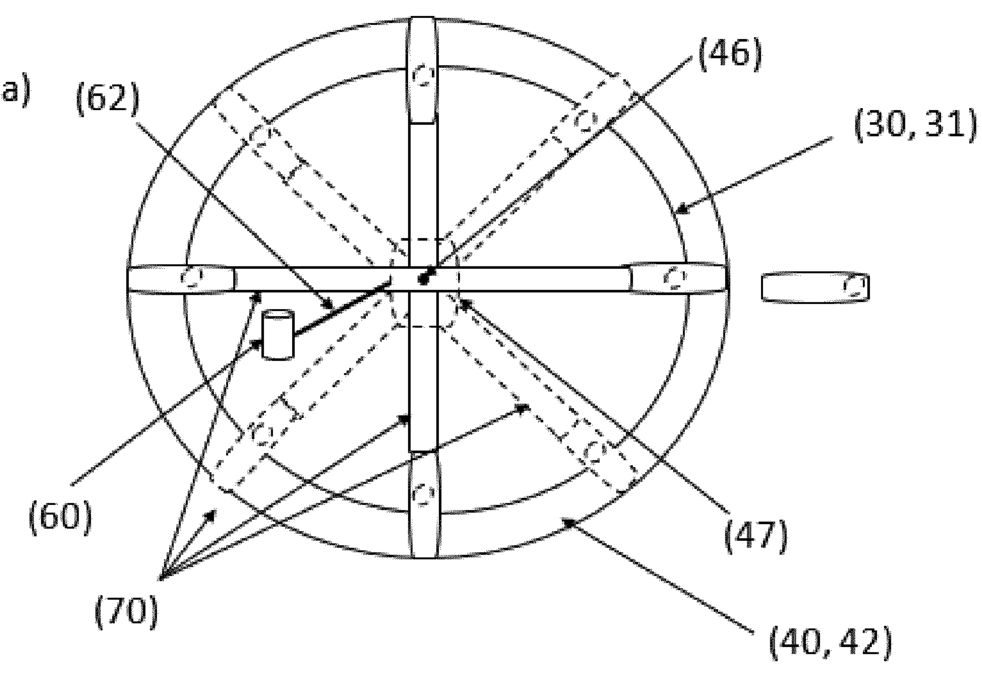
FIG. 8 shows a schematic setup of an example of a spray unit with a disc shape modifying assembly comprising an elastic film from a bottom view perspective.
Figure 8:
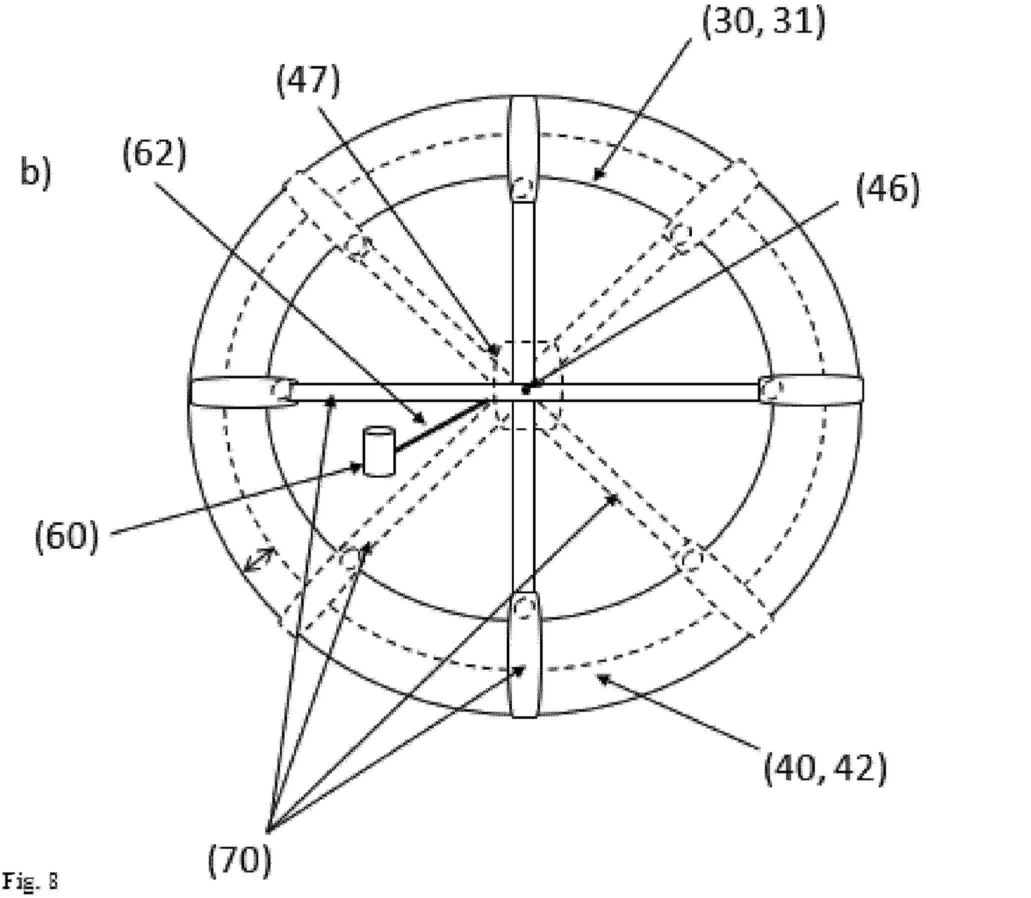
Figure 9:
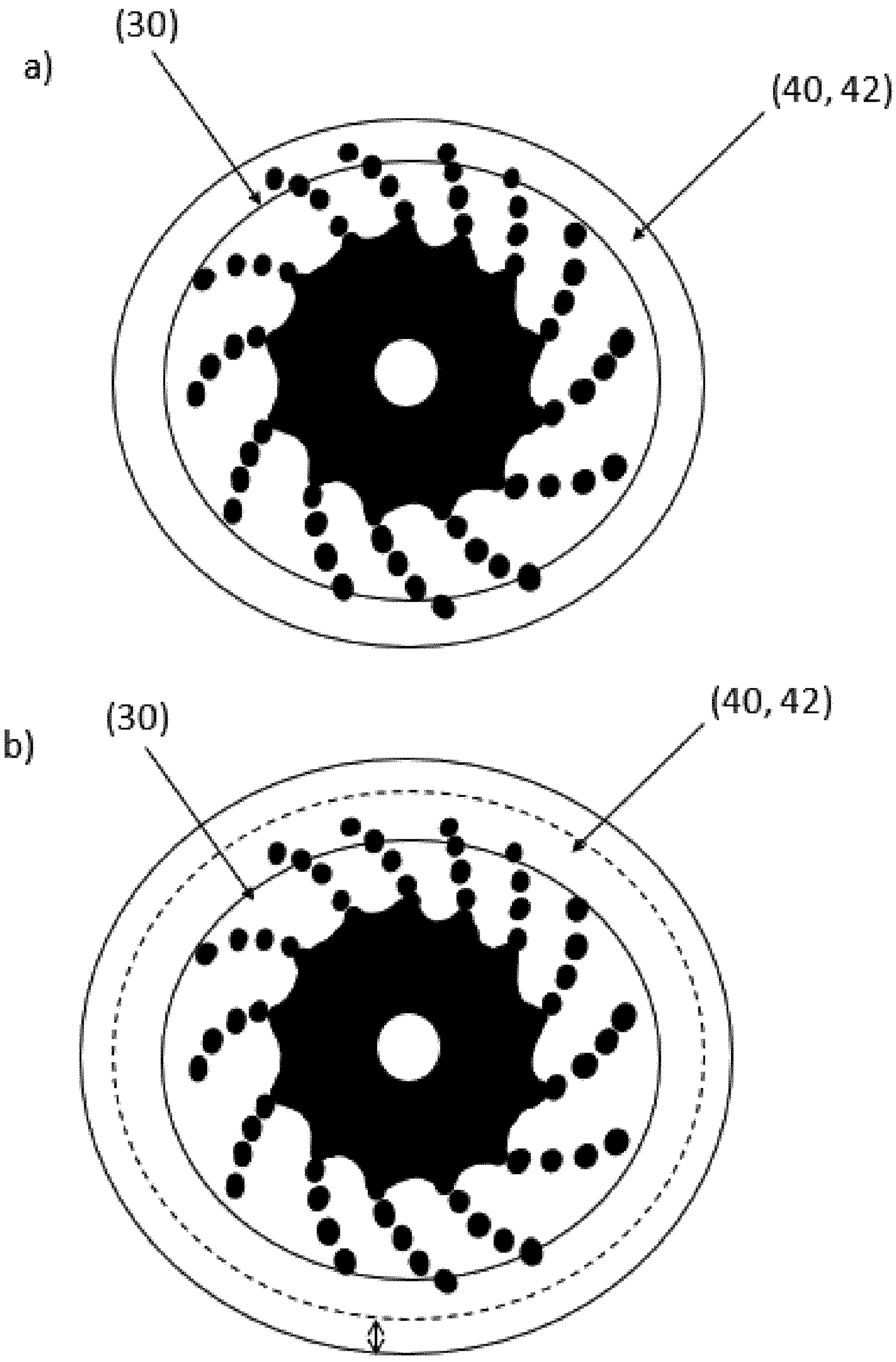
FIG. 9 shows a schematic setup of an example of a spray unit with a disc shape modifying assembly comprising an elastic film from a top view perspective.

In an example, a schematic setup of examples of disc shape modifying assemblies comprising elastic films is shown in FIGS. 8 to 9.

In an example, a schematic setup of examples of disc shape modifying assemblies comprising slotted circular discs is shown in FIGS. 10 to 13.

Figure 3:
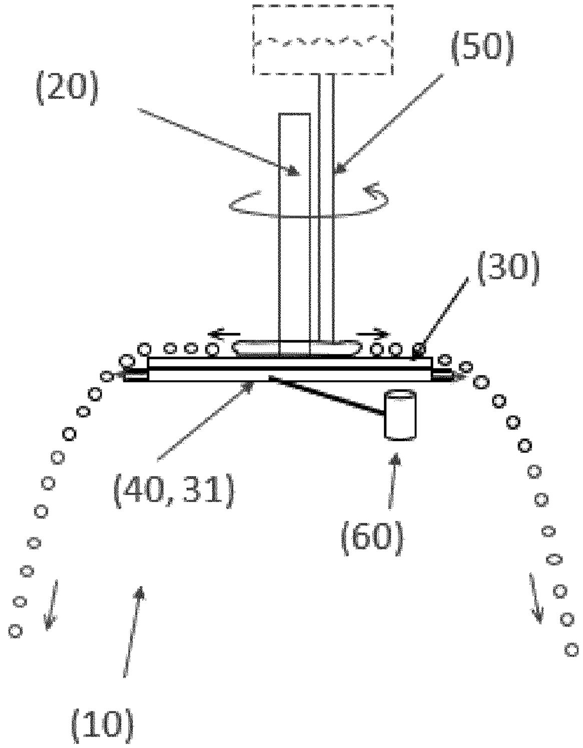
FIG. 3 shows a schematic setup of an example of a spray unit with the disc shape modifying assembly on a second disc from a side view perspective.

FIG. 3 shows a schematic setup of an example of a spray unit 10 with the disc shape modifying assembly 40 on a second disc 31 from a side view perspective. The spray unit comprises an axle 20, a disc 30, a second disc 31 with a disc shape modifying assembly 40, a liquid applicator 50 and at least one actuator 60. The disc is configured to spin about the axle centred on the centre of the disc. The liquid applicator is configured to apply liquid to a surface of the disc. The disc shape modifying assembly is configured to modify the trajectory of the liquid droplets that leave the spray unit by way of varying the diameter of the second disc. The arrows in FIG. 2 have the same meaning as shown in FIG. 1.

In an example, the second disc 31 is in proximity to the disc 30 and located underneath the disc 30 relative to the ground.

In an example, the second disc 31 is as close as possible to the disc 30 (e.g. a millimetre or less) still enabling the disc 30 to spin about the axle 20.

In an example, the second disc 31 is located substantially symmetrically parallel to the disc 30 (preferably axially minimally spaced).

In an example, the second disc 31 has a similar diameter as the disc 30.

Figure 4:
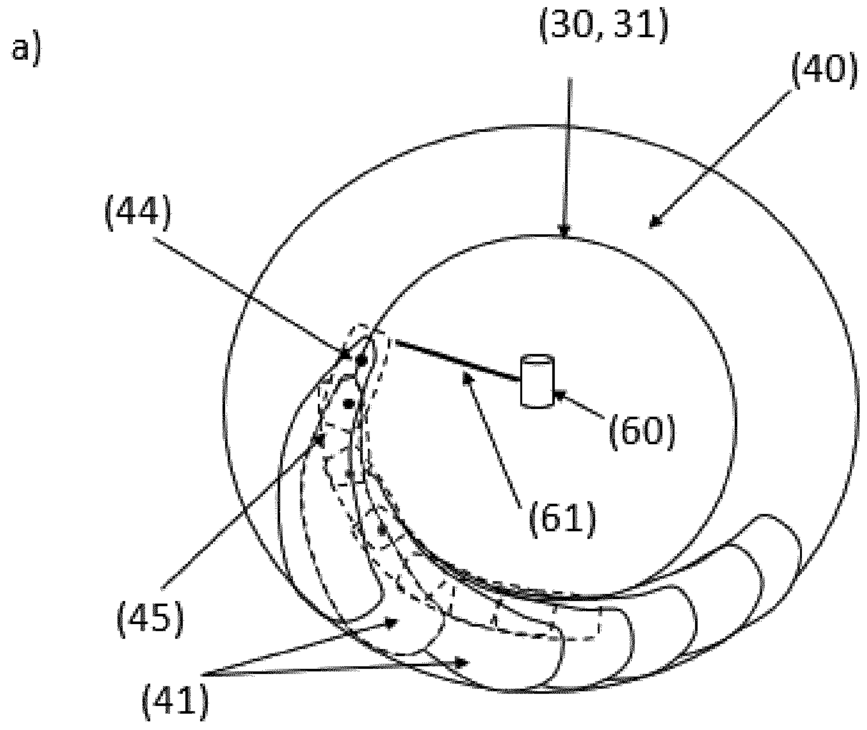
FIG. 4 shows a schematic setup of an example of a spray unit with a disc shape modifying assembly comprising blades from a bottom view perspective.
Figure 4:
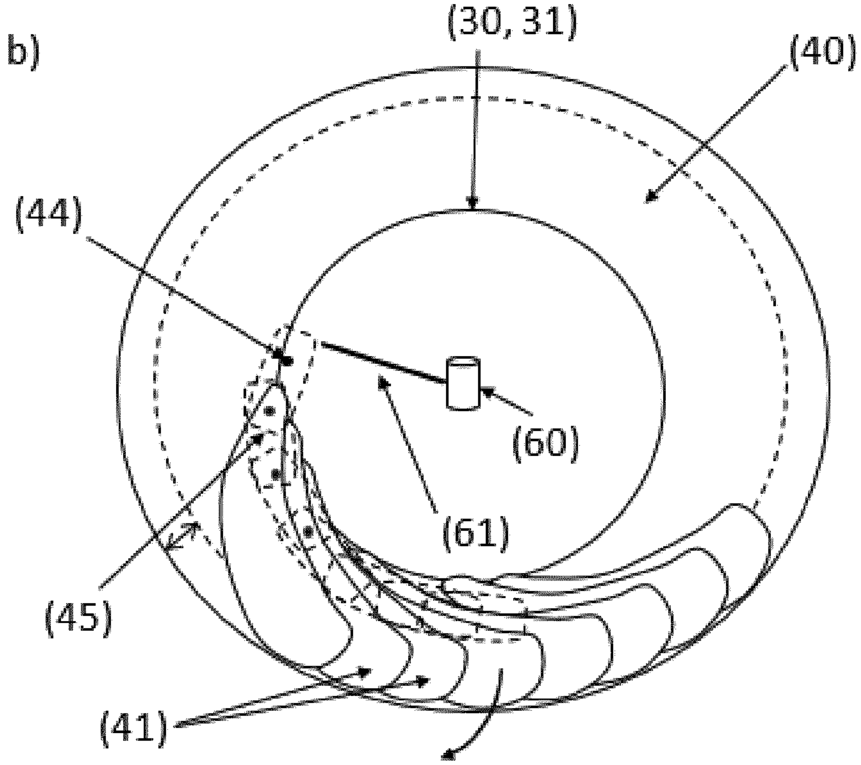

FIG. 4 shows a schematic setup of an example of a spray unit 10 with a disc 30 or a second disc 31 and a disc shape modifying assembly 40 comprising blades 41 from a bottom view perspective. The disc shape modifying assembly comprises at least two blades 41, at least one blade pivot point 44, a blade actuator linkage 61, and at least one inter-blade linkage 45, wherein the at least two blades 41 are each connected to the disc 30 or a second disc 31 by way of at least one blade pivot point 44 wherein the at least one actuator 60 is configured to be connected to at least one of the two blades 41 by way of a blade actuator linkage 61 and wherein the at least two blades are configured to be connected by at least one inter-blade linkage 45. In example a) in FIG. 4 some blades 41 are shown in their default (non-extended) position. In example b) in FIG. 4 all blades go out simultaneously by rotating about their blade pivot point in the direction as shown with the curved arrow. Simultaneous movement of all blades is enabled by actuator activity in cooperation with the blade actuator linkage and the inter-blade linkages. The wider diameter of the disc is indicated with the left right double arrow. For illustrative purposes FIG. 4 only shows some blades, blade pivot points and inter-blade linkages. In operation, these component parts are circumferentially distributed on the whole disc.

Figure 5:
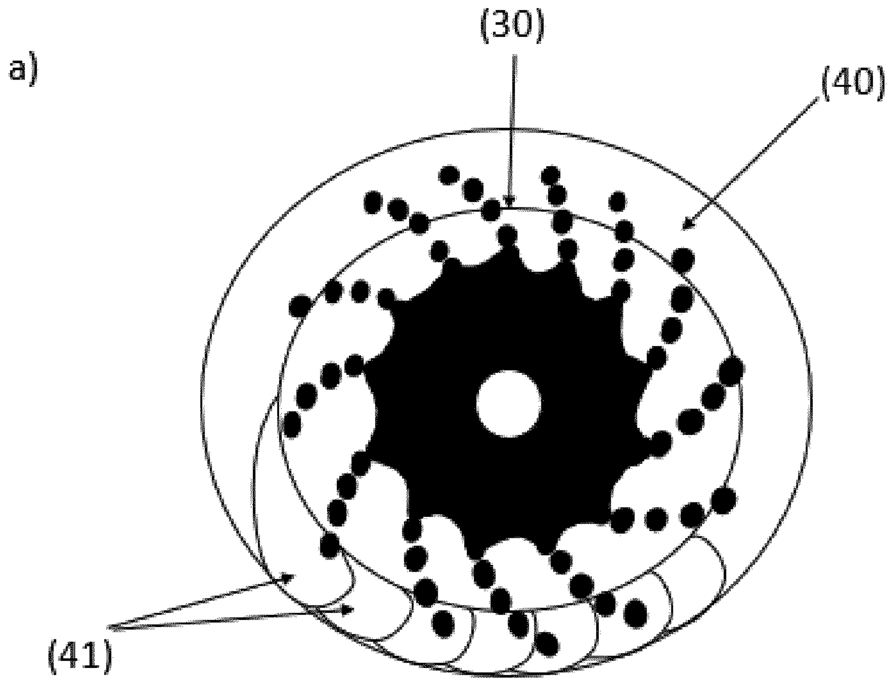
FIG. 5 shows a schematic setup of an example of a spray unit with a disc shape modifying assembly comprising blades from a top view perspective.
Figure 5:
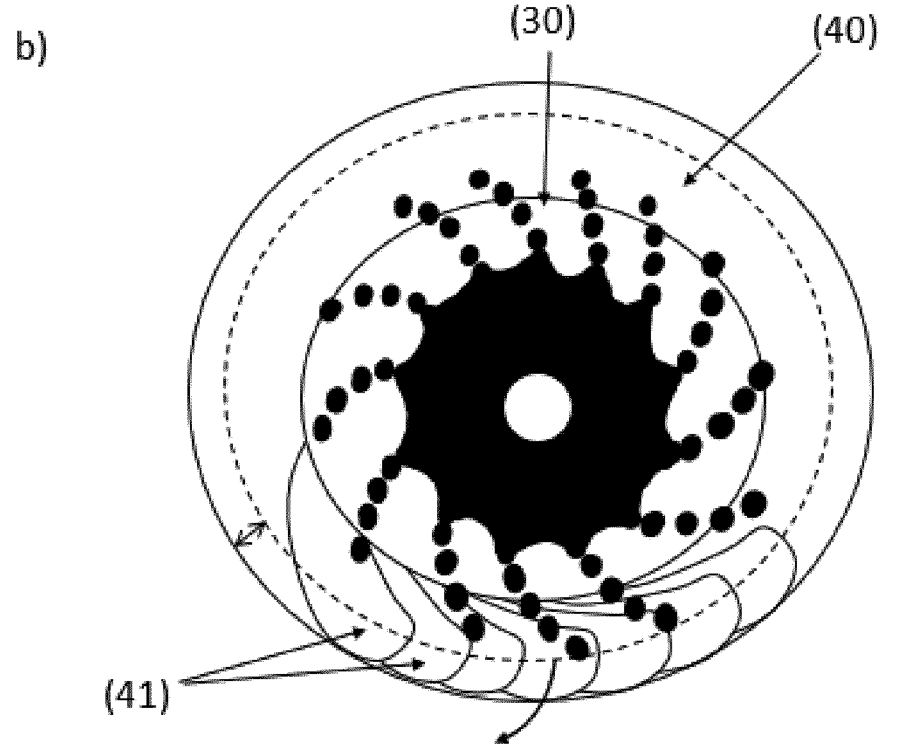

FIG. 5 shows a schematic setup of an example of a spray unit 10 with a disc 30 or a second disc 31 and a disc shape modifying assembly 40 comprising blades 41 from a top view perspective. The example is like the one discussed in FIG. 4 (however from a different view perspective). In example a) the blades are shown in their non-extended position whereas in example b) the blades are shown in their extended position which effectuates a wider diameter of the disc (as again indicated with the left right double arrow). FIG. 5 also shows the atomisation process of the liquid (in black). For illustrative purposes FIG. 5 only shows some blades. In operation, these component parts are circumferentially distributed on the whole disc.

In an example, the variation of the diameter of the disc 30 with the disc shape modifying assembly occurs at a radius from the centre of the disc greater than the radius at which the breakup of the liquid on the rotating (spinning) disc occurs.

Figure 6:
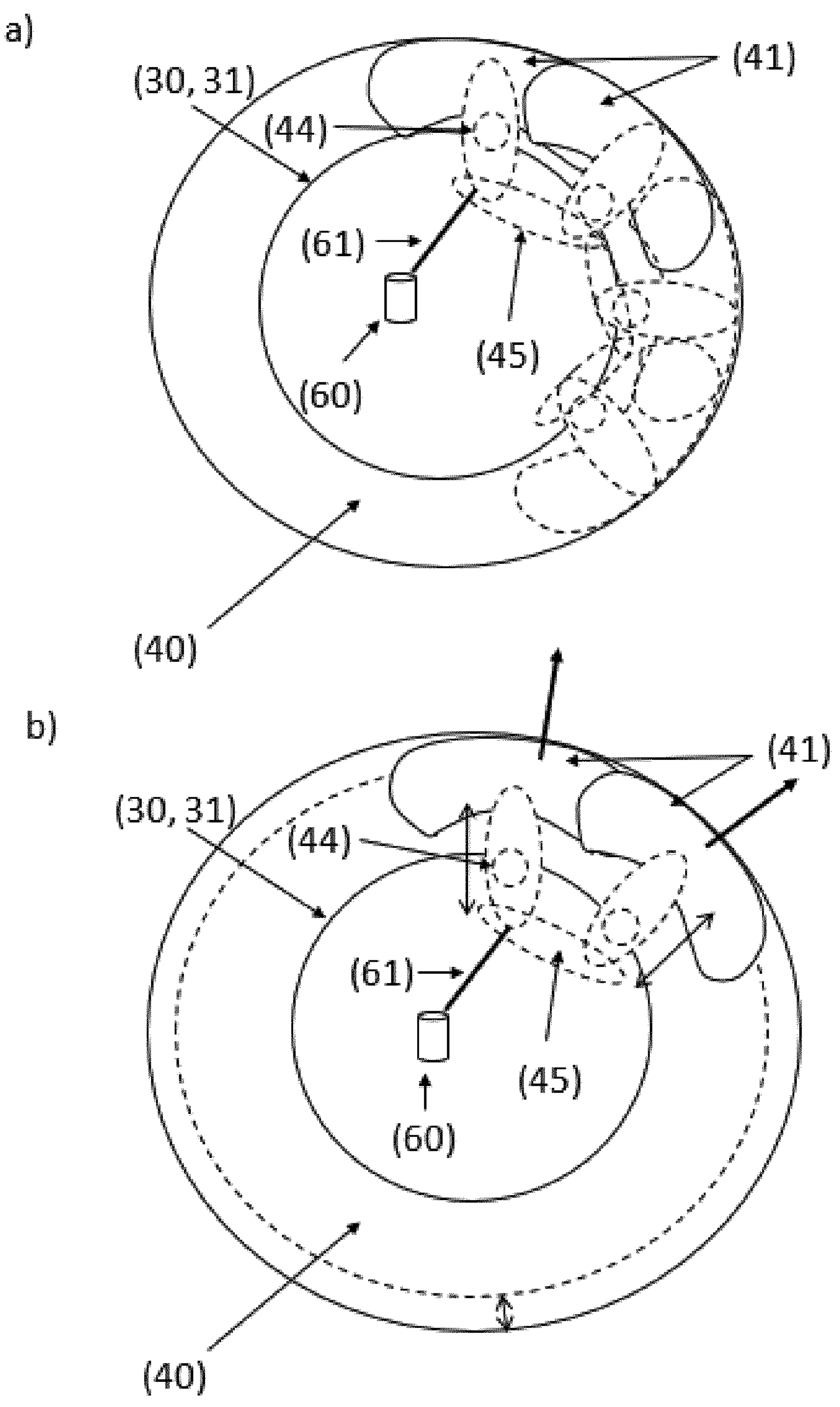
FIG. 6 shows a schematic setup of another example of a spray unit with a disc shape modifying assembly comprising blades from a bottom view perspective.

FIG. 6 shows a schematic setup of another example of a spray unit 10 with a disc 30 or a second disc 31 and a disc shape modifying assembly 40 comprising blades 41 from a bottom view perspective. The disc shape modifying assembly comprises at least two blades 41 (while each blade does also comprise the dotted ellipse), at least one blade pivot point 44, a blade actuator linkage 61, and at least one inter-blade linkage 45, wherein the at least two blades 41 are each connected to the disc 30 or a second disc 31 by way of at least one blade pivot point 44 (dotted circle) wherein the at least one actuator 60 is configured to be connected to at least one of the two blades 41 by way of a blade actuator linkage 61 and wherein the at least two blades are configured to be connected by at least one inter-blade linkage 45. In example a) in FIG. 6 some blades 41 are shown in their default (non-extended) position. In example b) in FIG. 6 all blades go out simultaneously by a radial movement along the blade pivot point in the direction as shown with the straight arrows. Simultaneous movement of all blades is enabled by the actuator in cooperation with the blade actuator linkage and the inter-blade linkages. The wider diameter of the disc is indicated with the left right double arrow. For illustrative purposes FIG. 4 only shows some blades, blade pivot points and inter-blade linkages. In operation, these component parts are circumferentially distributed on the whole disc.

In an example, the at least one actuator is configured to control the movement of the blades 41.

In an example, the blade(s) 41 are configured to move by at least one of an angle and a position.

In an example, the blade(s) 41 have a plane shape.

Figure 7:
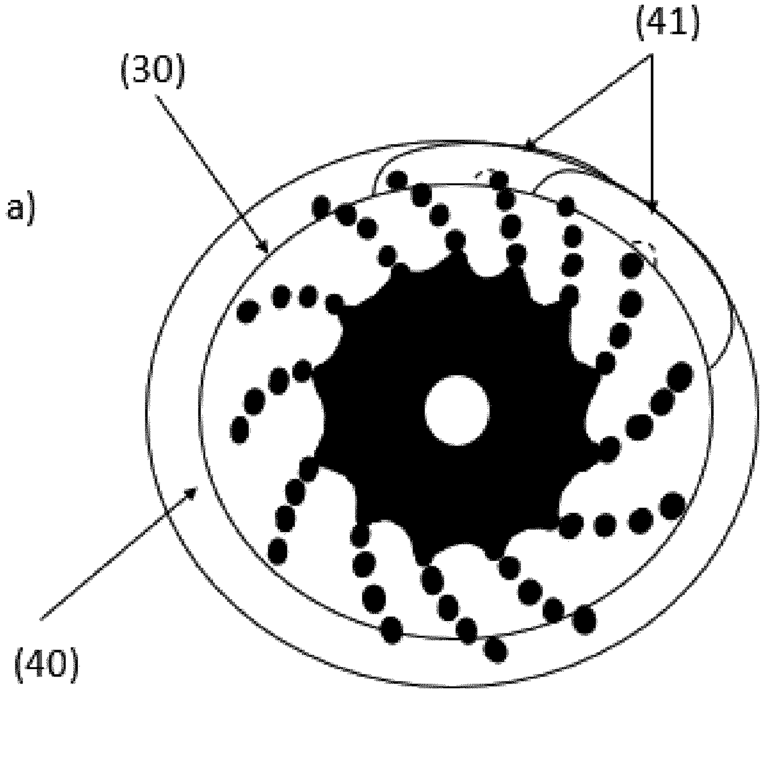
FIG. 7 shows a schematic setup of another example of a spray unit with a disc shape modifying assembly comprising blades from a top view perspective.
Figure 7:
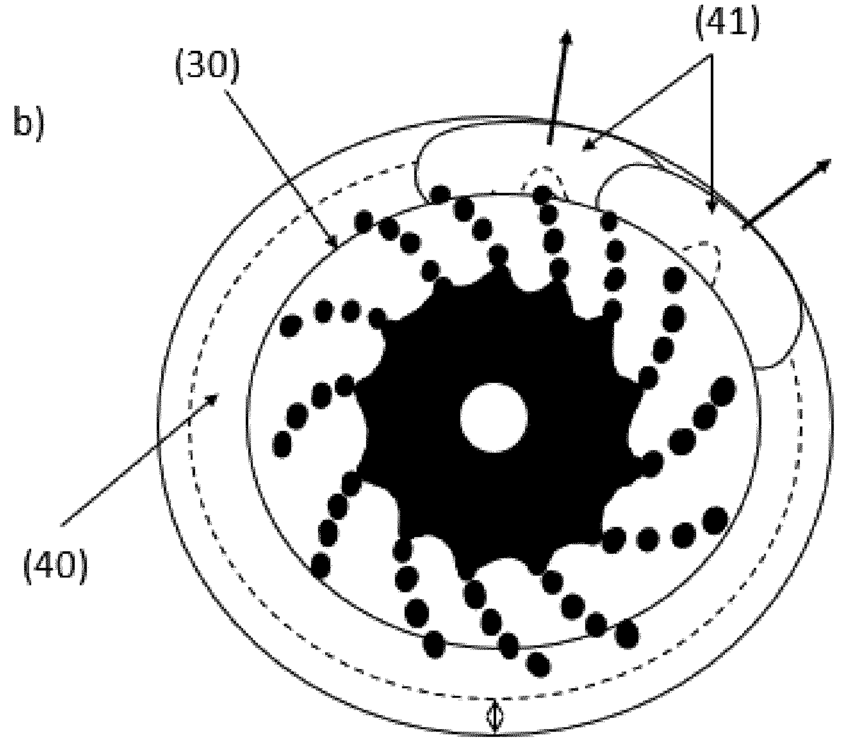

FIG. 7 shows a schematic setup of another example of a spray unit 10 with a disc 30 (or a second disc 31 which is not visible) and a disc shape modifying assembly 40 comprising blades 41 from a top view perspective. The example is like the one discussed in FIG. 6 (however from a different view perspective). In example a) the blades are shown in their non-extended position whereas in example b) the blades are shown in their extended position which effectuates a wider diameter of the disc (as again indicated with the left right double arrow). FIG. 7 also shows the atomisation process of the liquid (in black). For illustrative purposes FIG. 7 only shows some blades. In operation, these component parts go around the whole disc.

FIG. 8 shows a schematic setup of an example of a spray unit 10 with a disc 30 or a second disc 31 and a disc shape modifying assembly 40 comprising an elastic film 42 from a bottom view perspective. The disc shape modifying assembly comprises a concentric elastic film 42 attached to the edge of the disc 30 or a second disc 31 wherein the disc shape modifying assembly further comprises at least two extendable rods 70, at least one rod pivot point 46, a rod actuator linkage 62, and at least one inter-rod linkage 47, wherein the at least two extendable rods 70 are each connected to the disc or a second disc by way of at least one rod pivot point 46 and to the elastic film wherein the rods are configured to stretch or relax the elastic film equally in all radial directions wherein the at least one actuator 60 is configured to be connected to at least one of the two extendable rods by way of a rod actuator linkage 62 and wherein the at least two rods are configured to be connected by at least one inter-rod linkage 47. In example a) in FIG. 8 the elastic film is shown it its default (non-extended) position. In example b) in FIG. 8 the elastic film is stretched simultaneously in all radial directions. Simultaneous movement of the rods which stretch the elastic film is enabled by actuator activity in cooperation with the rod actuator linkage and the at least one inter-rod linkage. The wider diameter of the disc is indicated with the left right double arrow. For illustrative purposes FIG. 8 shows two extendable rods (positioned perpendicular to each other) and two optionally additional extendable rods (in dotted lines).

According to an example, the disc shape modifying assembly comprises at least four rods 70, at least one rod pivot point 46, a rod actuator linkage 62, at least one inter-rod linkage 47, wherein the at least four rods 70 are each connected to the disc 30 or a second disc 31 by way of at least one rod pivot point 46 and to the elastic film, wherein the rods are configured to stretch or relax the elastic film equally in all radial directions wherein the at least one actuator 60 is configured to be connected to at least one of the four extendable rods by way of a rod actuator linkage 62 and wherein the at least four rods are configured to be connected by at least one inter-rod linkage 47.

In an example, the disc shape modifying assembly comprises at least six rods 70, at least one rod pivot point 46, a rod actuator linkage 62, at least one inter-rod linkage 47, wherein the at least six rods 70 are each connected to the disc 30 or a second disc 31 by way of at least one rod pivot point 46 and to the elastic film, wherein the rods are configured to stretch or relax the elastic film equally in all radial directions wherein the at least one actuator 60 is configured to be connected to at least one of the six extendable rods by way of a rod actuator linkage 62 and wherein the at least six rods are configured to be connected by at least one inter-rod linkage 47.

In an example, the disc shape modifying assembly 40 comprises a plurality of extendable rods interacting in a similar as above described in connection with the at least six rods.

In another example, the at least one actuator is configured to control the movement of the extendable rods and therefore the extension of the elastic film.

In an example, an elastic film is a single layer film, a multicomponent elastic film material or a multilayer film material, preferably of constant thickness.

In an example, the elastic film is substantially continuous at least in the cross direction.

In an example, the elastic film is a thermoplastic polymer composition.

In an example, an extendable rod comprises a plurality of component parts configured to slide in/out from each other according to the telescopic principle.

According to an example, the rods (70) are arranged in a substantially radial symmetrical disposition underneath the disc (30) or underneath a second disc (31).

According to an example, the second disc (31) is located axially spaced underneath the disc (30).

In an example, the second disc (31) is axially minimally spaced to the disc (30).

FIG. 9 shows a schematic setup of an example of a spray unit 10 with a disc 30 or a second disc 31 (which is not visible in this perspective) and a disc shape modifying assembly 40 comprising an elastic film 42 from a top view perspective. The example is like the one discussed in FIG. 8 (however from a different view perspective). In example a) the elastic film is shown in its non-extended position whereas in example b) the elastic film is shown in its extended position which leads to a wider diameter of the disc (as again indicated with the left right double arrow). FIG. 9 also shows the atomisation process of the liquid (in black). The extendable rods 70 are not visible as they are located underneath the disc (relative to the ground), respectively the disc shape modifying assembly.

Figure 10:
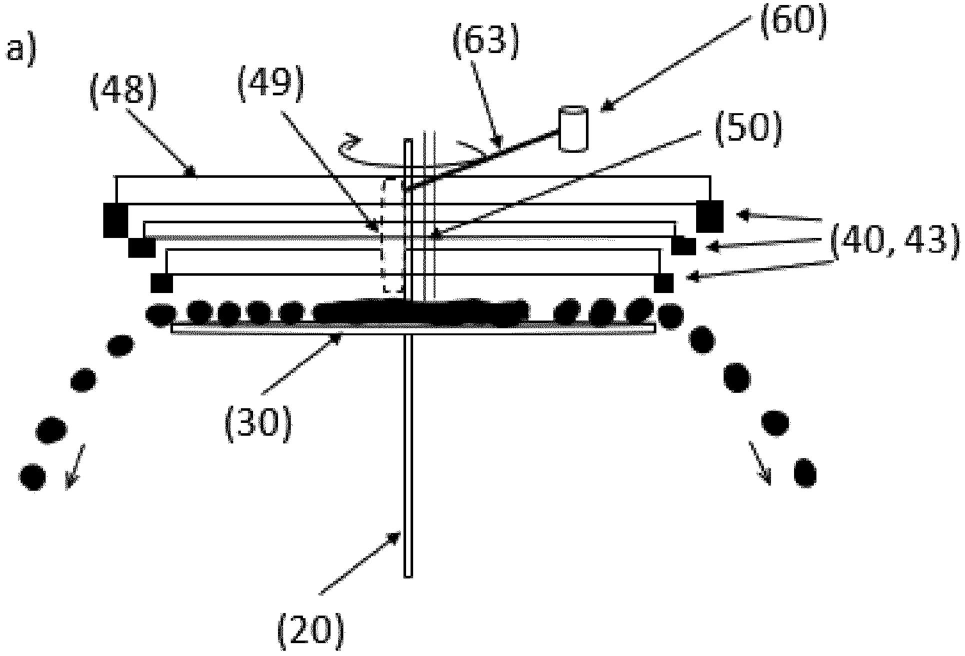
FIG. 10 shows a schematic setup of an example of a spray unit with a disc shape modifying assembly comprising slotted circular discs from a side view perspective.
Figure 10:
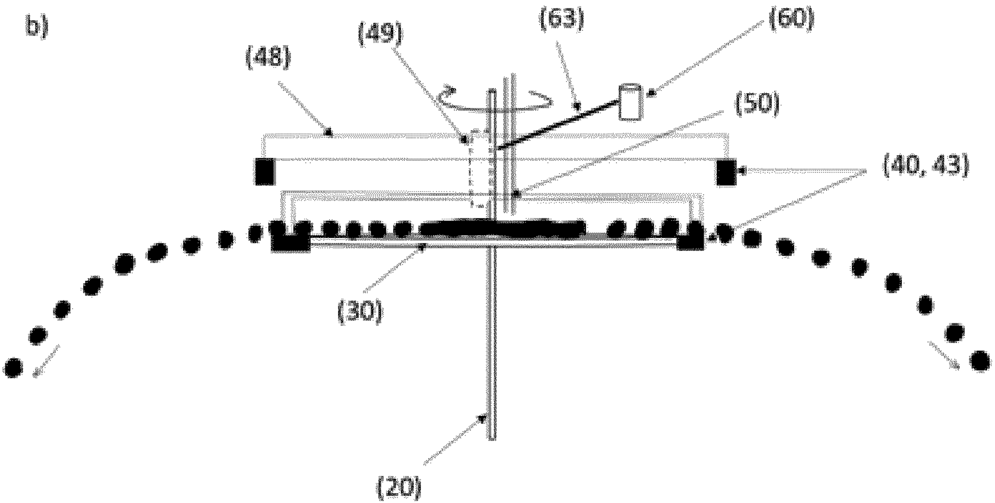

FIG. 10 shows a schematic setup of an example of a spray unit 10 with a disc shape modifying assembly 40 comprising at least one slotted circular disc 43 from a side view perspective. The spray unit comprises an axle 20, a disc 30, a disc shape modifying assembly 40 and a liquid applicator 50. The disc shape modifying assembly comprises at least one slotted circular disc 43 configured to laterally surround the disc 30 and thereby extending the diameter of the disc, wherein the at least one actuator 60 is configured to control the position of the at least one slotted circular disc relative to the disc.

In an example, an actuator 60 comprises a slotted circular disc actuator linkage element 63 which either directly connects the at least one actuator with the slotted circular disc or which physically interacts with the connecting element 48 of the slotted circular disc (the slotted circular disc 43 comprises the connecting element 48) to connect the at least one actuator with a circular slotted disc.

According to an example, the disc shape modifying assembly 40 comprises at least two slotted circular discs 43, wherein the second slotted circular disc is configured to laterally surround the first slotted circular disc and wherein the at least one actuator 60 is configured to control the position of the second slotted circular disc relative to the first slotted circular disc and/or the disc 30.

In an example, the shape modifying assembly 40 comprises at least one inter-slotted circular disk linkage 49 and wherein at least two slotted circular discs 43 are configured to be connected by at least one inter-slotted circular disk linkage 49.

In an example, the disc shape modifying assembly 40 comprises a plurality of slotted circular discs interacting in a similar as above described in connection with the first and the second slotted disc.

In another example, the at least one actuator is configured to control the movement of the at least one slotted circular disc.

In an example, the at least one slotted circular disc is located in proximity above or underneath the disc (relative to the ground).

In an example, the plurality of slotted circular discs are located in proximity above and/or underneath the disc (relative to the ground).

In example a) of FIG. 10 the disc 30 is shown whereas a plurality of slotted circular discs are in proximity to the disc above the surface of the disc. The plurality of the circular slotted discs do not intervene with the liquid atomisation process. In example b) of FIG. 10 the disc is laterally surrounded by a first slotted circular disc and the first slotted disc is laterally surrounded by a second slotted circular disc. Therefore, the diameter of the disc is wider in comparison to the diameter of the disc as shown in example a) and therefore also the spray swath is wider than the spray swath as shown in example a) (provided that all other relevant parameters remain the same).

In an example, the arrow close to the axle indicates a potential rotation direction of the axle and the disc. The rotation can also be clockwise.

In an example, the arrows next to the liquid droplets that have left the spray unit indicate the spraying direction.

Figure 11:
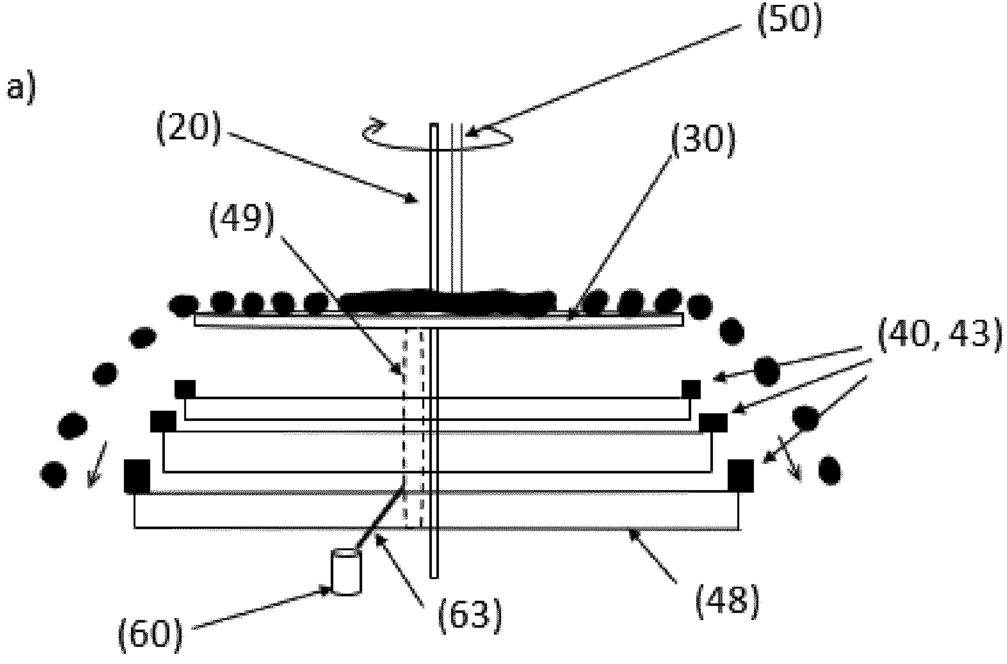
FIG. 11 shows a schematic setup of another example of a spray unit with a disc shape modifying assembly comprising slotted circular discs from a side view perspective.
Figure 11:
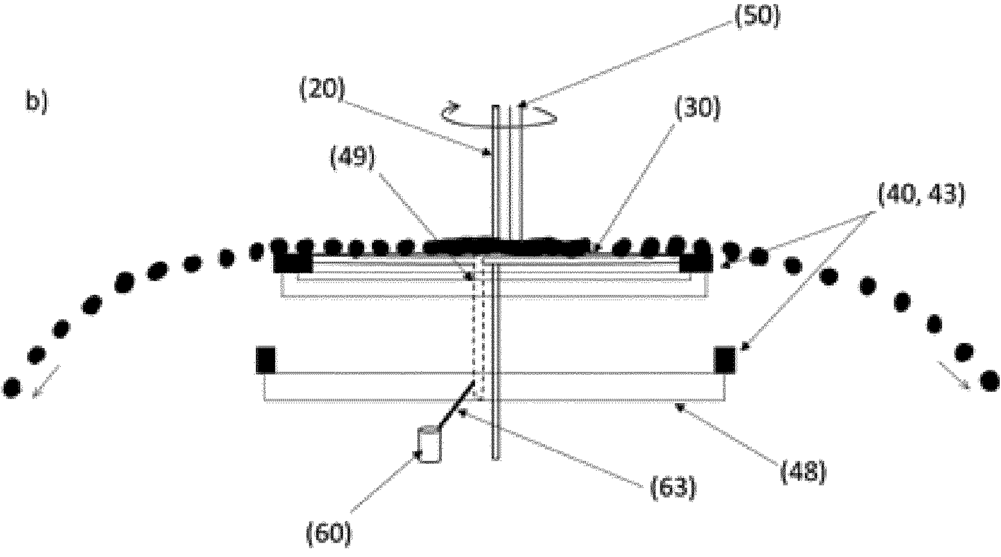

FIG. 11 shows a schematic setup of another example of a spray unit 10 with a disc shape modifying assembly comprising at least one slotted circular disc from a side view perspective. The example is similar to the one shown in FIG. 10 with the exception that the at least one circular disc is located underneath the disc (relative to the ground) and is moved from underneath towards the disc in order to laterally surround the disc and extend the diameter of the disc. In example a) of FIG. 11 the disc 30 is shown whereas a plurality of slotted circular discs 43 (as part of the disc shape modifying assembly 40) are in proximity to the disc underneath the surface of the disc. The plurality of the circular slotted discs do not intervene with the liquid atomisation process. In example b) of FIG. 11 the disc is laterally surrounded by a first slotted circular disc and the first slotted disc is laterally surrounded by a second slotted circular disc. Therefore, the diameter of the disc is wider in comparison to the diameter of the disc as shown in example a) and therefore also the spray swath is wider than the spray swath as shown in example a) (provided that all other relevant parameters remain the same).

In an example, the arrow close to the axle indicates a potential rotation direction of the axle and the disc. The rotation can also be clockwise.

In an example, the arrows next to the liquid droplets that have left the spray unit indicate the spraying direction.

Figure 12:
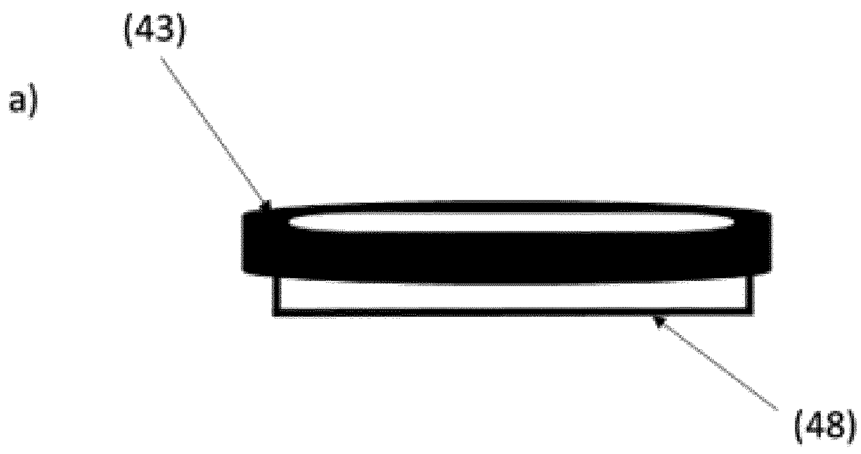
FIG. 12 shows schematic examples of slotted circular discs from different perspectives.
Figure 12:
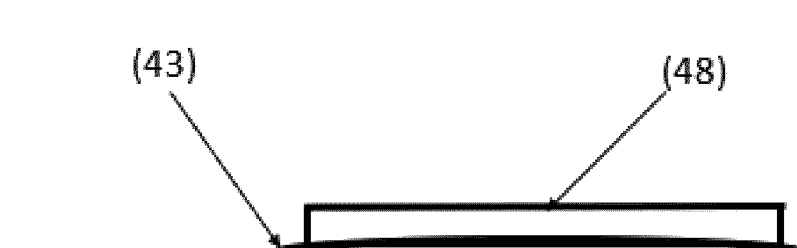
Figure 12:
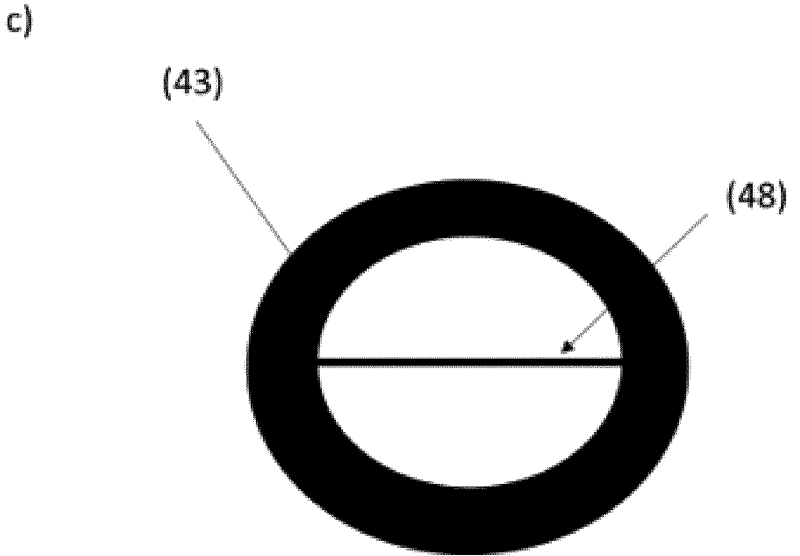

FIG. 12 shows schematic examples of slotted circular discs 43 from different perspectives. Example a) and b) of FIG. 12 show a slotted circular disc wherein an optional connecting element 48 is located above or underneath the slotted circular disc from a side view perspective. The optional connecting element 48 allows to centrally control the movement of the at least one slotted circular disc relative to the disc. Example c) shows a similar slotted circular disc from a top view perspective.

Figure 13:
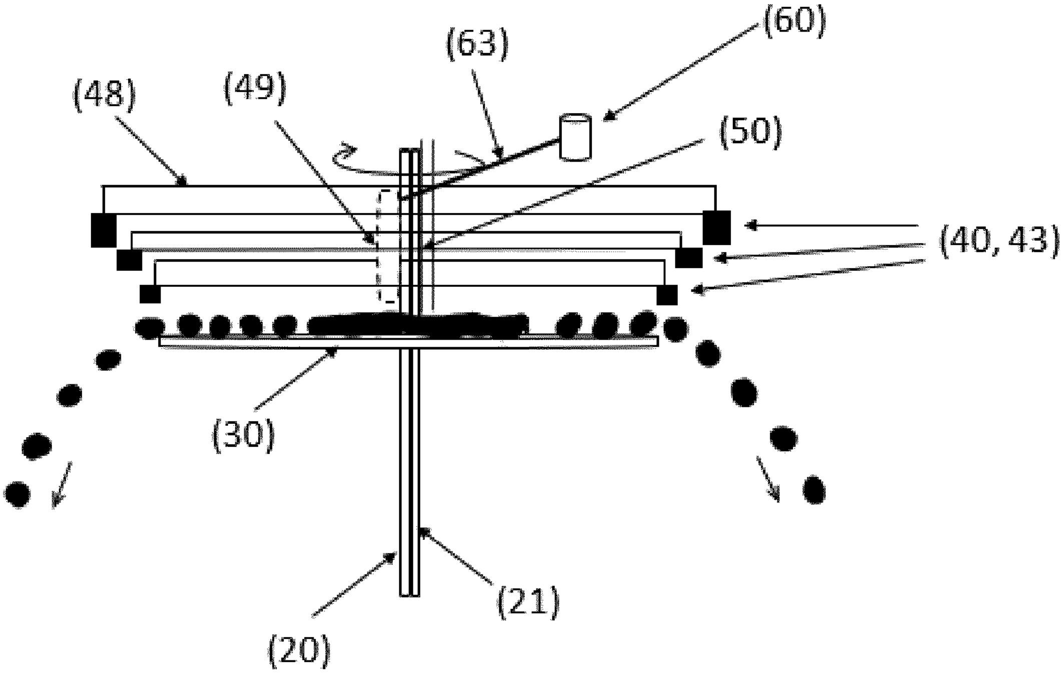
FIG. 13 shows a schematic setup of another example of a spray unit with a disc shape modifying assembly comprising slotted circular discs and a second axle from a side view perspective.

FIG. 13 shows a schematic setup of another example of a spray unit 10, a second axle 21 and a disc shape modifying assembly 40 comprising a plurality of slotted circular discs 43 from a side view perspective. The spray unit comprises an axle 20, a second axle 21, a disc 30, a disc shape modifying assembly 40, a liquid applicator 50 and at least one actuator 60. The disc shape modifying assembly comprises a plurality of slotted circular disc 43 configured to laterally surround the disc 30 and thereby extending the diameter of the disc, wherein the at least one actuator is configured to control the position of the at least one slotted circular disc relative to the disc. The at least one actuator comprises a slotted circular disc actuator linkage element 63 which connects the connecting element 48 of the slotted circular disc with the at least one actuator. The plurality of slotted circular discs are connected by a inter-slotted circular disk linkage 49. The disc 30 spins about the axle 20. The plurality of slotted circular discs 43 are connected to the second axle 21 via the connecting element 48 preferably in the centre of the connecting element. The arrows in FIG. 13 have the same meaning as discussed in FIG. 11. The second axle 21 can be non-rotating or rotating.

According to an example, the disc shape modifying assembly is configured to spin about the axle 20 or a second axle 21.

According to an example, the disc shape modifying assembly is non-rotating.

According to an example, at least the part of the surface of the disc shape modifying assembly on which the liquid droplets impinge when leaving the outer edge of the disc 30 has a low friction surface.

In an example, such as surface is hydrophobic.

The surface chemistry of such a surface can be changed. For smooth surfaces, the surface adhesion of a spray liquid (either as a film, ligament or drop) can be changed in this way. For an aqueous liquid, a hydrophilic surface will have a higher adhesion with lower slip, while a hydrophobic surface will have a lower adhesion with higher slip (and vice versa for an oil). However, for smooth surfaces the range of adhesions accessible is not high (as seen by the narrow contact angle range).

In an example, such a surface of the disc shape modifying assembly is textured.

The surface can e.g. comprise comb-like structures. As an example, 3D printing can be used to generate textured surface structures.

In an example, the size of the textured features is between 10 nm to 100 microns, preferably from 1 micron to 80 microns. The range of adhesions (and contact angles) is significantly expanded for micro-textured surfaces. (More details are presented in the paper by Bico et al, Wetting of textured surfaces, Colloids and Surfaces A 206 (2002) 41-16).

In an example, such a surface of the disc shape modifying assembly has a contact angle with water >110°, preferably >120°.

In an example, such a surface is super-hydrophobic, preferably with a contact angle with water >150°. It is known to the skilled person in the art that greater the angle the lower the adhesion.

Recent advances in the wetting of textured surfaces has resulted in surfaces that are non-wetting to a wide range of liquids. (More details are presented in A Tuteja et al, Robust omniphobic surfaces, PNAS 105 (2008) 18200-18205, US 2019/0077968A1, US 2019/0039796A1, US 2015/0273518A1, https://en.wikipedia.org/wiki/LiquiGlide). Such surfaces can also be used for at least a part of the surface of the disc shape modifying assembly.

In an example, the spray unit can be used for boom sprayers, UAVs, Unmanned Ground Vehicles (UGV), robotics platforms and back-pack sprayers.

Figure 14:
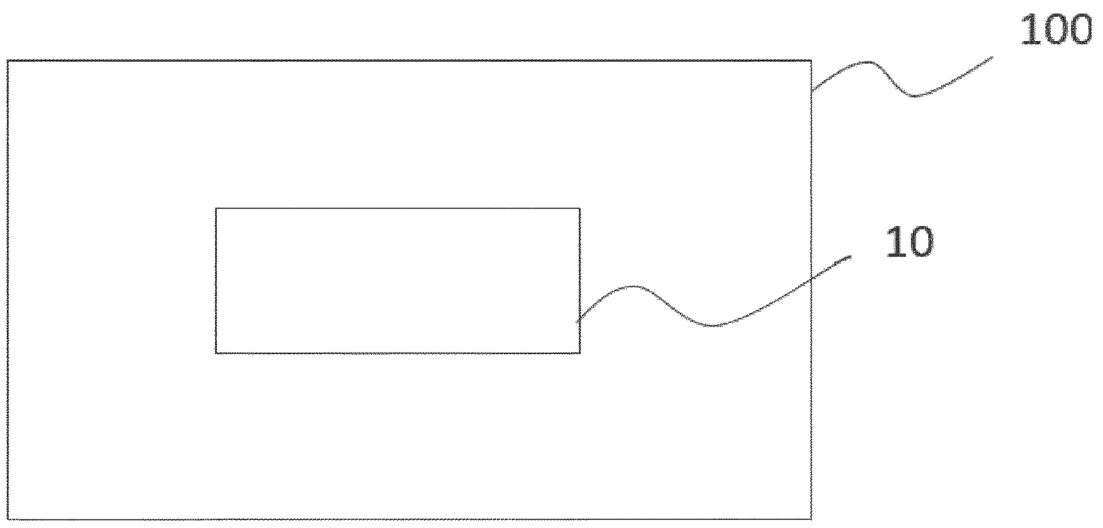
FIG. 14 shows a schematic setup of an example of a spray vehicle comprising a spray unit.

FIG. 14 shows a schematic example of a spray vehicle 100 with a spray unit 10 as described with respect to one of the FIGS. 1 to 13.

In an example, the spray vehicle is a drone or UAV.

In an example, the spray vehicle is a land vehicle such as an Unmanned Ground Vehicles (UGV), a robotic platform, tractor.

Figure 15:
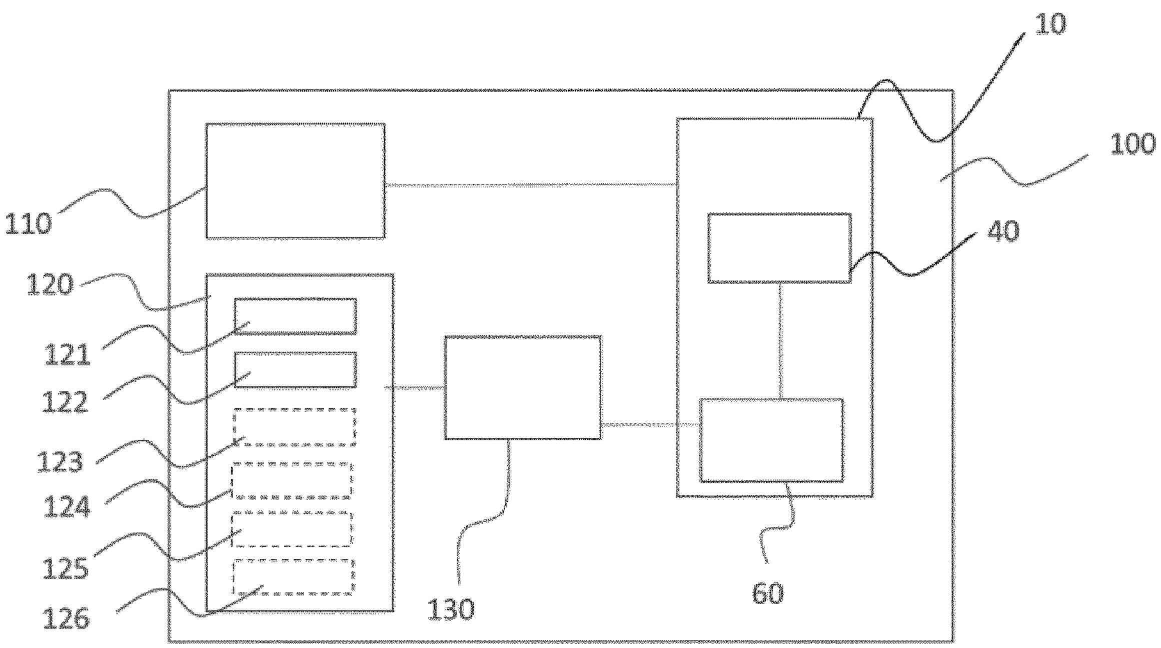
FIG. 15 shows a schematic example of a spray vehicle with a spray unit and the control of the disc shape modifying assembly.

FIG. 15 shows a schematic example of a spray vehicle 100 with a spray unit 10 and the control of the at least one actuator 60 and therefore the disc shape modifying assembly 40. The spray vehicle comprises a liquid tank 110, at least one spray unit 10 as discussed herein e.g. in connection with FIGS. 1 to 13, a plurality of sensors 120 and a processing unit 130. The liquid tank is configured to hold a liquid. The at least one spray unit is configured to spray a liquid. At least one sensor 121 of the plurality of sensors is configured to measure the rotational speed of the disc 30 about the axle 20 centred on the centre of the disc. At least one sensor 122 of the plurality of sensors is configured to measure the liquid flow rate of the liquid applicator 50 to the surface of the disc 30. The processing unit is configured to determine the liquid droplet size of the liquid droplets that leave the spray unit (alternatively, the liquid droplet size of the liquid droplets at the edge of the disc after atomisation on the disc) comprising utilisation of the measured rotational speed of the disc, the measured liquid flow rate of the liquid from the liquid applicator to the surface of the disc, and the physico-chemical properties of the liquid. The processing unit is configured to control the at least one actuator 60 of the spray unit, wherein determination of at least one instruction for the control of the at least one actuator comprises utilisation of the determined liquid droplet size.

In an example, the at least one sensor 121 configured to measure the rotational speed of the disc about the axle comprises a tachometer (RPM gauge).

In an example, the at least one sensor 122 configure to measure the liquid flow rate of the liquid applicator to the surface of the disc is a rotameter.

In an example, the processing unit is configured to control the at least one actuator, wherein determination of at least one instruction for the control of the at least one actuator comprises utilisation of the determined liquid droplet size, the measured rotational speed of the disc, the measured liquid flow rate of the liquid from the liquid applicator to the surface of the disc, and the physico-chemical properties of the liquid.

In an example, the processing unit is configured to determine the liquid droplet spectra of the liquid droplets that leave the spray unit (alternatively, the liquid droplet spectra of the liquid droplets at the edge of the disc after atomisation on the disc) and the processing unit is configured to control the at least one actuator, wherein determination of at least one instruction for the control of the at least one actuator comprises utilisation of the determined liquid droplet spectra.

The term "liquid droplet spectra" refers to the liquid droplet size distribution.

In an example, the spray vehicle further comprises an input unit configured to receive data of the physico-chemical properties of the liquid. The input unit is configured to provide the processing unit with the information about the physico-chemical properties of the liquid. As an example, the physico-chemical properties of the liquid can be encoded in a QR code on the packaging of the liquid which can be scanned e.g. by an input unit of the spray vehicle.

According to an example, at least one sensor 123 of the plurality of sensors is configured to measure a speed of the spray vehicle relative to the ground and at least one sensor 124 of the plurality of sensors is configured to measure an air movement direction relative to the spray vehicle with respect to a fore-aft axis of the spray vehicle and at least one sensor 125 of the plurality of sensors is configured to measure an air movement speed relative to the spray vehicle, wherein the processing unit is configured to determine an air movement direction relative to a projection of the fore-aft axis onto the ground and determine an air movement speed relative to the ground, the determination comprising utilisation of the speed of the spray vehicle, the air movement direction relative to the spray vehicle with respect to the fore-aft axis of the spray vehicle and the air movement speed relative to the spray vehicle and wherein the processing unit is configured to control the rotational speed of the disc, the liquid flow rate of the liquid from the liquid applicator to the surface of the disc and/or at least one actuator, wherein determination of at least one instruction for the control comprises utilisation of the determined air movement direction relative to the projection of the fore-aft axis onto the ground and the determined air movement speed relative to the ground.

In an example, the at least one actuator is configured to control the disc shape modifying assembly 40, preferably to move the at least one geometry defining component.

In an example, the at least one actuator is configured to control the movement of the blades 41.

In another example, the at least one actuator is configured to control the movement of the extendable rods 70 and therefore the extension of the elastic film 42.

In another example, the at least one actuator is configured to control the movement of the at least one slotted circular disc 43.

According to an example, the spray vehicle further comprises at least one sensor 126 of the plurality of sensors configured to provide data from which the height of the spray vehicle above the ground can be determined. The processing unit is configured to control the rotational speed of the disc, the liquid flow rate of the liquid from the liquid applicator to the surface of the disc and/or the at least one actuator, wherein the determination of at least one instruction for the control comprises utilisation of the determined air movement direction relative to the projection of the fore-aft axis onto the ground, the determined air movement speed relative to the ground and the determined height of the spray vehicle above the ground.

In an example, the control of the rotational speed of the disc may also include the control of the rotational speed of the second disc 31.

In an example, the at least one sensor 123 configured to measure a speed of the spray vehicle relative to the ground comprises a GPS system.

In an example, the at least one sensor 123 configured to measure a speed of the spray vehicle relative to the ground comprises a laser reflectance based system.

In an example, the at least one sensor 124 configured to measure an air movement direction relative to the spray vehicle comprises a wind vane.

In an example, the at least one sensor 125 configured to measure an air movement speed relative to the spray vehicle comprises an anemometer.

In an example, the at least one sensor 125 configured to measure an air movement speed relative to the spray vehicle comprises a pitot tube.

In an example, the at least one sensor 124 and 125 configured to measure an air movement direction, speed (and distance) relative to the spray vehicle comprises a LIDAR sensor, preferably a Doppler LIDAR sensor.

In an example, the sensor 126 used to determine height is a radar sensor.

In an example, the sensor 136 used to determine height is a laser time of flight sensor.

Figure 16:
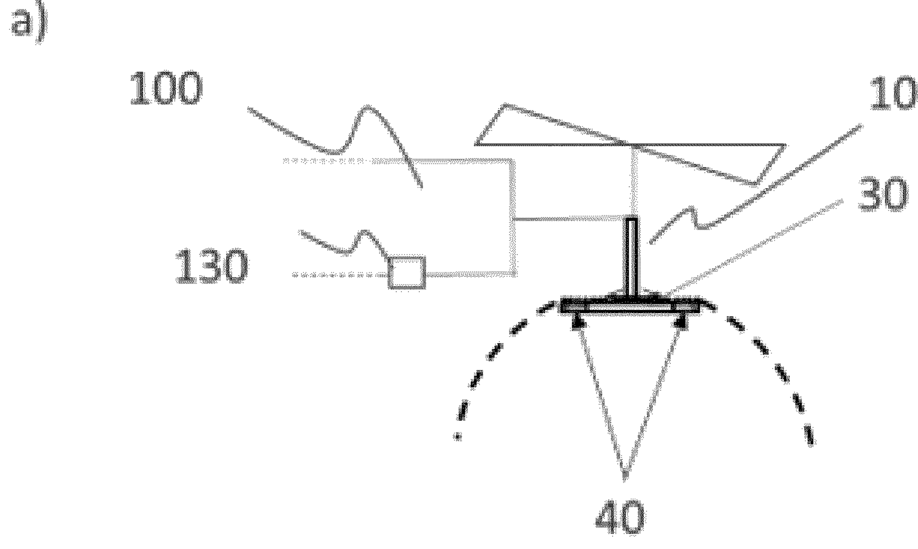
FIG. 16 shows a schematic example of a spray vehicle with a spray unit and the control of the disc shape modifying assembly as a function of different liquid droplet sizes.
Figure 16:
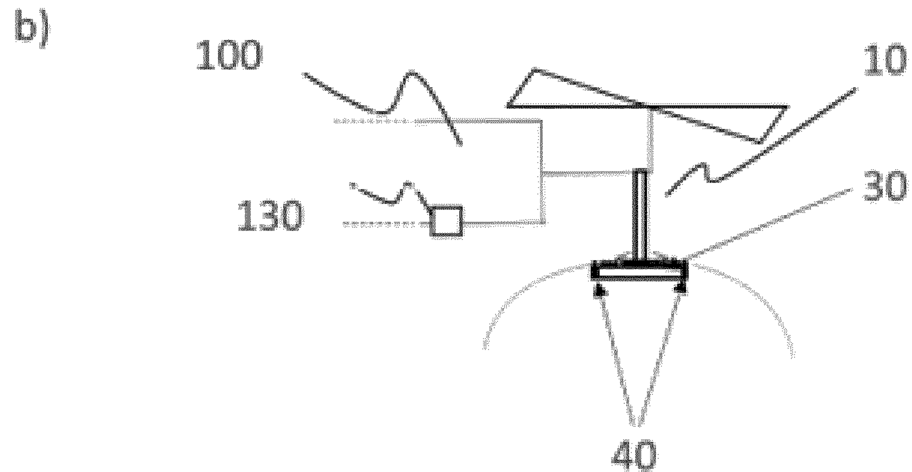

FIG. 16 shows a schematic example of a spray vehicle 100 with a spray unit 10 and the control of the disc shape modifying assembly 40 as a function of different liquid droplet sizes. In this example, the spray vehicle is a UAV and does comprise at least one spray unit located beneath a propeller unit of the UAV. The spray unit does comprise a spray direction assembly 40 with spray direction assembly configured vary the diameter of the disc 30. The plurality of sensors 120 (not shown) sense—among others—the rotation of the disc and the liquid flow from the liquid applicator to the surface of the disc. The processing unit 130 determines the liquid droplet size of the liquid droplets that leave the spray unit. The processing unit further uses the sensed and calculated information in order to instruct the at least one actuator (not shown) to control the diameter of the disc via the disc shape modifying assembly. In example a) the droplet size of the atomised liquid that leaves the spray unit is large (and the rotation speed of the disc is low) and the geometry defining component of the disc shape modifying assembly is moved to extend the diameter of the disc. In example b) the droplet size of the atomised liquid droplets that leave the spray unit is small (and the rotation speed of the disc is high) and the geometry defining component of the disc shape modifying assembly is moved into its non-extended position in order to generate a similar spray swath as in example a). The liquid flow rate and the liquid in example a) and example b) is assumed to be the same.

It has to be noted that embodiments of the invention are described with reference to different subject matters. In particular, some embodiments are described with reference to spray unit type claims whereas other embodiments are described with reference to spray vehicle type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word “comprising” does not exclude other elements or steps, and the indefinite article “a” or “an” does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. A spray unit, comprising:

an axle;

a disc;

a disc shape modifying assembly; and a liquid applicator;

wherein, the disc is configured to spin about the axle centered on the center of the disc;

wherein, the liquid applicator is configured to apply liquid to a surface of the disc;

wherein the disc shape modifying assembly is configured to modify a trajectory of liquid droplets that leave the spray unit by way of varying a diameter of the disc while the disc spins about the axle centered on the center of the disc.

2. The spray unit according to claim 1, wherein the disc shape modifying assembly comprises at least one movable geometry defining component configured to vary the diameter of the disc or a second disc by way of change of at least a part of the geometry defining component’s position, and wherein the disc shape modifying assembly comprises at least one actuator configured to move the at least one geometry defining component.

3. The spray unit according to claim 2, wherein the disc shape modifying assembly comprises at least one geometry defining component selected from the group of a blade, an elastic film, and/or a slotted circular disc.

4. The spray unit according to claim 3, wherein the disc shape modifying assembly comprises at least two blades, each connected to the disc or the second disc by way of at least one blade pivot point, wherein the at least one actuator is configured to be connected to at least one of the two blades by way of a blade actuator linkage and wherein the at least two blades are configured to be connected by at least one inter-blade linkage.

5. The spray unit according to claim 3, wherein the disc shape modifying assembly comprises a concentric elastic film attached to the edge of the disc or the second disc, wherein the disc shape modifying assembly further comprises at least two extendable rods each connected to the disc or a second disc by way of at least one rod pivot point and to the elastic film wherein the at least two rods are configured to stretch or relax the elastic film equally in all radial directions wherein the at least one actuator is configured to be connected to at least one of the two extendable rods by way of a rod actuator linkage and wherein the at least two rods are configured to be connected by at least one inter-rod linkage.

6. The spray unit according to claim 5, wherein the at least two extendable rods of the disc shape modifying assembly comprise at least four extendable rods each connected to the disc or the second disc by way of the at least one rod pivot point and to the elastic film, wherein the at least two rods are configured to stretch or relax the elastic film equally in all radial directions wherein the at least one actuator is configured to be connected to at least one of the at least four extendable rods by way of the rod actuator linkage and wherein the at least four rods are configured to be connected by the at least one inter-rod linkage.

7. The spray unit according to claim 5, wherein the at least two rods are arranged in a substantially radial symmetrical disposition underneath the disc or underneath the second disc.

8. The spray unit according to claim 2, wherein the second disc is located axially spaced underneath the disc.

9. The spray unit according to claim 3, wherein the disc shape modifying assembly comprises at least one slotted circular disc configured to laterally surround the disc and thereby extend the diameter of the disc, wherein the at least one actuator is configured to control a position of the at least one slotted circular disc relative to the disc.

10. The spray unit according to claim 9, wherein the disc shape modifying assembly comprises at least two slotted circular discs, wherein the second slotted circular disc is configured to laterally surround the first slotted circular disc and wherein the at least one actuator is configured to control a position of the second slotted circular disc relative to the first slotted circular disc and/or the disc.

11. The spray unit according to claim 1, wherein the disc shape modifying assembly is configured to spin about the axle or a second axle.

12. The spray unit according to claim 1, wherein the disc shape modifying assembly is non-rotating.

13. The spray unit according to claim 1, wherein at least a part of a surface of the disc shape modifying assembly on which the liquid droplets impinge when leaving the outer edge of the disc has a low friction surface.

14. A spray unit, comprising:
an axle;
a disc;
a disc shape modifying assembly, including:
at least one movable geometry defining component configured to vary a diameter of the disc or a second disc by way of change of at least a part of the geometry defining component's position; and
at least one actuator configured to move the at least one geometry defining component; and
a liquid applicator;
wherein the disc is configured to spin about the axle centered on the center of the disc;
wherein the liquid applicator is configured to apply liquid to a surface of the disc; and
wherein the disc shape modifying assembly is configured to modify a trajectory of liquid droplets that leave the spray unit by way of varying a diameter of the disc.

15. A spray unit, comprising:
an axle;
a disc;
a disc shape modifying assembly; and
a liquid applicator;
wherein the disc is configured to spin about the axle centered on the center of the disc;
wherein the liquid applicator is configured to apply liquid to a surface of the disc;
wherein the disc shape modifying assembly is configured to modify a trajectory of liquid droplets that leave the spray unit by way of varying a diameter of the disc; and
wherein the disc shape modifying assembly is non-rotating.

16. A spray unit, comprising:
an axle;
a disc;
a disc shape modifying assembly; and
a liquid applicator;
wherein the disc is configured to spin about the axle centered on the center of the disc;
wherein the liquid applicator is configured to apply liquid to a surface of the disc;
wherein the disc shape modifying assembly is configured to modify a trajectory of liquid droplets that leave the spray unit by way of varying a diameter of the disc; and
wherein at least a part of a surface of the disc shape modifying assembly on which the liquid droplets impinge when leaving the outer edge of the disc has a low friction surface.

* * * * *